United States Patent
Gilbert

(10) Patent No.: US 12,083,934 B2
(45) Date of Patent: Sep. 10, 2024

(54) REAR TRACK FITTING FOR PASSENGER SEAT

(71) Applicant: Safran Seats USA LLC, Gainesville, TX (US)

(72) Inventor: Klay E. Gilbert, Lindsay, TX (US)

(73) Assignee: Safran Seats USA LLC, Gainesville, TX (US)

( * ) Notice: Subject to any disclaimer, the term of this patent is extended or adjusted under 35 U.S.C. 154(b) by 306 days.

(21) Appl. No.: 17/618,128

(22) PCT Filed: Jul. 31, 2019

(86) PCT No.: PCT/US2019/044319
§ 371 (c)(1),
(2) Date: Dec. 10, 2021

(87) PCT Pub. No.: WO2021/021152
PCT Pub. Date: Feb. 4, 2021

(65) Prior Publication Data
US 2022/0274507 A1    Sep. 1, 2022

(51) Int. Cl.
*B60N 2/015*    (2006.01)
*B64D 11/06*    (2006.01)

(52) U.S. Cl.
CPC ...... *B60N 2/01575* (2013.01); *B64D 11/0696* (2013.01)

(58) Field of Classification Search
CPC .... B60N 2/08; B60N 2/0806; B60N 2/01575; B64D 11/0696
See application file for complete search history.

(56) References Cited

U.S. PATENT DOCUMENTS

| | | | | |
|---|---|---|---|---|
| 3,677,195 A | * | 7/1972 | Prete, Jr. | B60N 2/01575 410/105 |
| 4,723,732 A | | 2/1988 | Gorges | |
| 4,771,969 A | * | 9/1988 | Dowd | B64D 11/0696 244/118.6 |
| 5,762,296 A | * | 6/1998 | Gilbert | B64D 11/0696 410/71 |

(Continued)

OTHER PUBLICATIONS

International Patent Application No. PCT/US2019/044319, International Search Report and Written Opinion, dated Mar. 18, 2020.

(Continued)

*Primary Examiner* — Monica E Millner
(74) *Attorney, Agent, or Firm* — Kilpatrick Townsend & Stockton LLP

(57) ABSTRACT

Described are track fitting assemblies for passenger seats. Each track fitting assembly includes a track fitting main body and an anti-rattle shear body. The track fitting main body is connectable to a leg of the passenger seat and includes a forward end, an aft end, and at least one stud configured to engage a track. The anti-rattle shear body is positionable on the track fitting main body and is movable relative to the track fitting main body. The anti-rattle shear body includes a forward end, an aft end, and a plunger at the forward end and configured to engage the track. The anti-rattle shear body is connected to the track fitting main body such that the plunger of the anti-rattle shear body is forward of the forward end of the track fitting main body.

20 Claims, 5 Drawing Sheets

(56) References Cited

U.S. PATENT DOCUMENTS

| | | | | |
|---|---|---|---|---|
| 6,902,365 | B1 * | 6/2005 | Dowty | B64D 11/0696 |
| | | | | 244/118.6 |
| 7,455,276 | B2 * | 11/2008 | Frey | B60P 7/0815 |
| | | | | 248/500 |
| 7,713,009 | B2 * | 5/2010 | Hudson | B64D 11/0696 |
| | | | | 410/104 |
| 8,292,224 | B1 * | 10/2012 | Ahad | B64D 11/0696 |
| | | | | 244/118.6 |
| 8,827,228 | B2 * | 9/2014 | Zunino | B64D 11/0696 |
| | | | | 244/118.6 |
| 9,663,232 | B1 * | 5/2017 | Porter | B60N 2/01566 |
| 10,189,375 | B2 * | 1/2019 | Stubbe | B64D 11/0696 |
| 11,180,258 | B2 * | 11/2021 | Chadwell | B60N 2/01558 |
| 2007/0164187 | A1 | 7/2007 | Frey | |
| 2022/0032821 | A1 * | 2/2022 | Parker | B60N 2/0806 |

OTHER PUBLICATIONS

Europe Patent Appl. No. 19752401.0, Office Action, Nov. 10, 2023.

* cited by examiner

REAR TRACK FITTING FOR PASSENGER SEAT

FIELD OF THE INVENTION

The field of the invention relates to seat mounting assemblies for passenger vehicles such as aircraft.

BACKGROUND

Many seats such on passenger vehicles such as aircraft, buses, trains, and the like are removably mounted in a track secured to the floor of the vehicle. The tracks typically include a channel where two lips partially enclose the upper side of the channel to form a slot. Semicircular cutout portions are spaced along the lips to create a series of larger circular openings in the slot. Typically, a track fitting assembly is used to couple the passenger seat to the track, where the track fitting assembly includes an aft fitting that has studs that extend outwardly from the track fitting body. The studs are typically designed with a flared end attached to a narrower neck. The flared ends of the studs pass through the larger circular openings (e.g., in a vertical direction), and the track fitting assembly is moved along the track (e.g., in a horizontal direction) until the flared ends contact the underside of the slot lips. Standard threaded fasteners or wedge-type elements are commonly used to create a snug fit between the studs and the track lips to prevent seat rattle and unintended seat displacement. Typical track fitting assemblies may have difficulty attaching to some tracks, particularly think tracks, and the stability of the connection between the track fitting assemblies and tracks may thus be weakened or compromised.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a track fitting assembly for a passenger seat includes a track fitting main body and an anti-rattle shear body. The track fitting main body is connectable to a leg of the passenger seat and includes a forward end, an aft end, and at least one stud configured to engage a track. The anti-rattle shear body is positionable on the track fitting main body and is movable relative to the track fitting main body. The anti-rattle shear body includes a forward end, an aft end, and a plunger at the forward end and configured to engage the track. In some examples, the anti-rattle shear body is connected to the track fitting main body such that the plunger of the anti-rattle shear body is forward of the forward end of the track fitting main body.

In various embodiments, the track fitting assembly includes a biasing mechanism between the track fitting main body and the anti-rattle shear body. The biasing mechanism may bias the anti-rattle shear body away from the track fitting main body. In certain embodiments, the at least one stud includes at least four studs. The track fitting main body may include a protuberance configured to connect to the leg of the passenger seat, and the at least one stud of the track fitting main body may be forward of the protuberance.

In some embodiments, the anti-rattle shear body includes a forward aperture between the forward end and the aft end, an aft aperture between the forward aperture and the aft end, and a connecting portion between the forward aperture and the aft aperture. A first portion of the protuberance may be positionable within the forward aperture, a second portion of the protuberance may be positionable within the aft aperture, and the connecting portion may be configured to engage a third portion of the protuberance between the first portion and the second portion. In certain aspects, the track fitting assembly includes a fastener engaging the connecting portion of the anti-rattle shear body and the third portion of the protuberance such that the anti-rattle shear body is connected to the track fitting main body. In various cases, the plunger is a first plunger and the anti-rattle shear body includes a second plunger between the first plunger and the aft end of the anti-rattle shear body.

According to certain embodiments of the present invention, a track fitting assembly for a passenger seat includes a track fitting main body and an anti-rattle shear body. The track fitting main body includes a base having a forward end, an aft end, and at least one stud configured to engage a track. The track fitting main body also includes a protuberance extending from the base between the forward end and the aft end. The anti-rattle shear body is positionable on the track fitting main body and includes a forward end, an aft end, a forward aperture between the forward end and the aft end, and an aft aperture between the forward aperture and the aft end. In certain embodiments, the anti-rattle shear body is movable relative to the track fitting main body such that a first portion of the protuberance is positionable within the forward aperture and a second portion of the protuberance is positionable within the aft aperture.

In some embodiments, the track fitting assembly includes a biasing mechanism between the track fitting main body and the anti-rattle shear body, and the biasing mechanism biases the anti-rattle shear body away from the track fitting main body. The biasing mechanism may include at least two springs between the track fitting main body and the anti-rattle shear body. In some examples, a first spring of the at least two springs is between the track fitting main body and the anti-rattle shear body forward of the protuberance, and a second spring of the at least two springs is between the track fitting main body and the anti-rattle shear body aft of the protuberance or between the track fitting main body and the protuberance.

In various embodiments, the anti-rattle shear body includes a plunger at the forward end that is configured to engage the track, wherein the anti-rattle shear body is connected to the track fitting main body such that the plunger of the anti-rattle shear body is forward of the forward end of the track fitting main body. In certain examples, the anti-rattle shear body includes a connecting portion between the forward aperture and the aft aperture, and the connecting portion is configured to engage a third portion of the protuberance between the first portion and the second portion. The track fitting assembly may include a fastener engaging the connecting portion of the anti-rattle shear body and the third portion of the protuberance such that the anti-rattle shear body is connected to the track fitting main body. In various examples, the at least one stud includes a plurality of studs, and at least one stud of the plurality of studs is forward of the protuberance.

According to certain embodiments of the present invention, a track fitting assembly for a passenger seat includes a track fitting main body and an anti-rattle shear body. The track fitting main body includes a forward end, an aft end, and a plurality of studs configured to engage a track. The anti-rattle shear body is positionable on the track fitting main body and is movable relative to the track fitting main body. The anti-rattle shear body includes a forward end, an aft end, and a plunger configured to engage the track. In some examples, the anti-rattle shear body is connected to the track fitting main body such that the plunger is forward of a forward-most stud of the plurality of studs of the track fitting main body.

In some embodiments, the plunger is a first plunger, and the anti-rattle shear body includes a second plunger between the first plunger and the aft end of the anti-rattle shear body. In various aspects, the track fitting main body includes a protuberance between the forward end and the aft end of the track fitting main body and configured to connect to a leg of the passenger seat. At least one stud of the plurality of studs may be forward of the protuberance. In certain embodiments, the anti-rattle shear body includes a forward aperture between the forward end and the aft end, an aft aperture between the forward aperture and the aft end, and a connecting portion between the forward aperture and the aft aperture. A first portion of the protuberance may be positionable within the forward aperture, a second portion of the protuberance may be positionable within the aft aperture, and the connecting portion is configured to engage a third portion of the protuberance between the first portion and the second portion.

In various embodiments, the plurality of studs includes at least four studs. The track fitting assembly may include a biasing mechanism between the track fitting main body and the anti-rattle shear body that biases the anti-rattle shear body away from the track fitting main body.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

Figure 1:
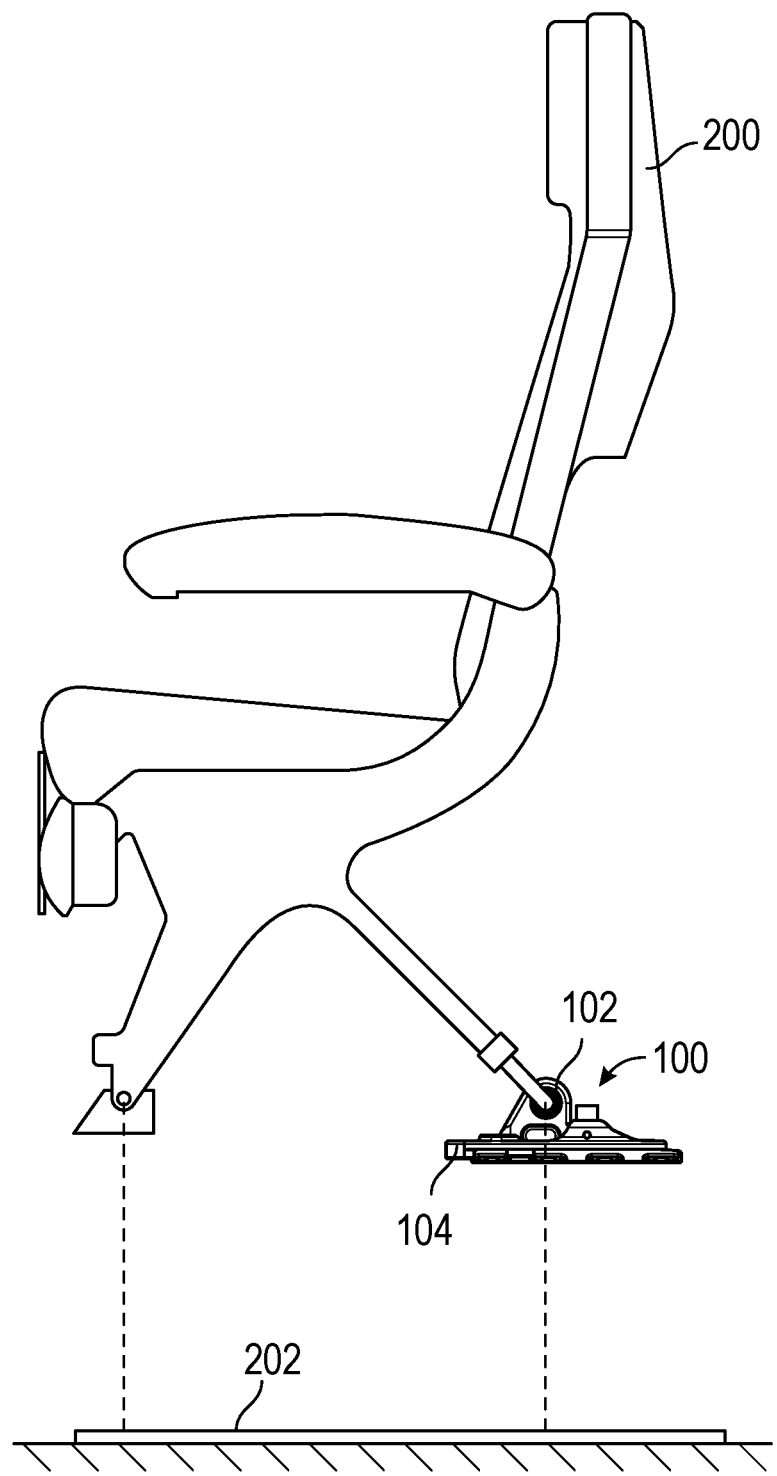
FIG. 1 is a side view of a passenger seat with a track fitting assembly according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide track fitting assembly for passenger seats. While the track fitting assembly is discussed for use with aircraft seats, it is by no means so limited. Rather, embodiments of the track fitting assembly may be used in passenger seats or other seats of any type or otherwise as desired.

According to certain embodiments of the present invention, as shown in FIGS. 1-7, a track fitting assembly 100 for a passenger seat 200 includes a track fitting main body 102 and an anti-rattle shear body 104. The track fitting assembly 100 is used to secure the passenger seat 200 to a track 202. The track fitting assembly 100 may be formed of materials including but not limited to aluminum, stainless steel, aramid fibers, polycarbonate, polypropylene, other metallic materials, composite materials, or other similar materials that are able to provide the necessary structural integrity for securing the track fitting assembly 100 to the track 202. Additionally, each feature of the track fitting assembly 100 may be formed of the same materials or of different materials as desired.

Figure 2:
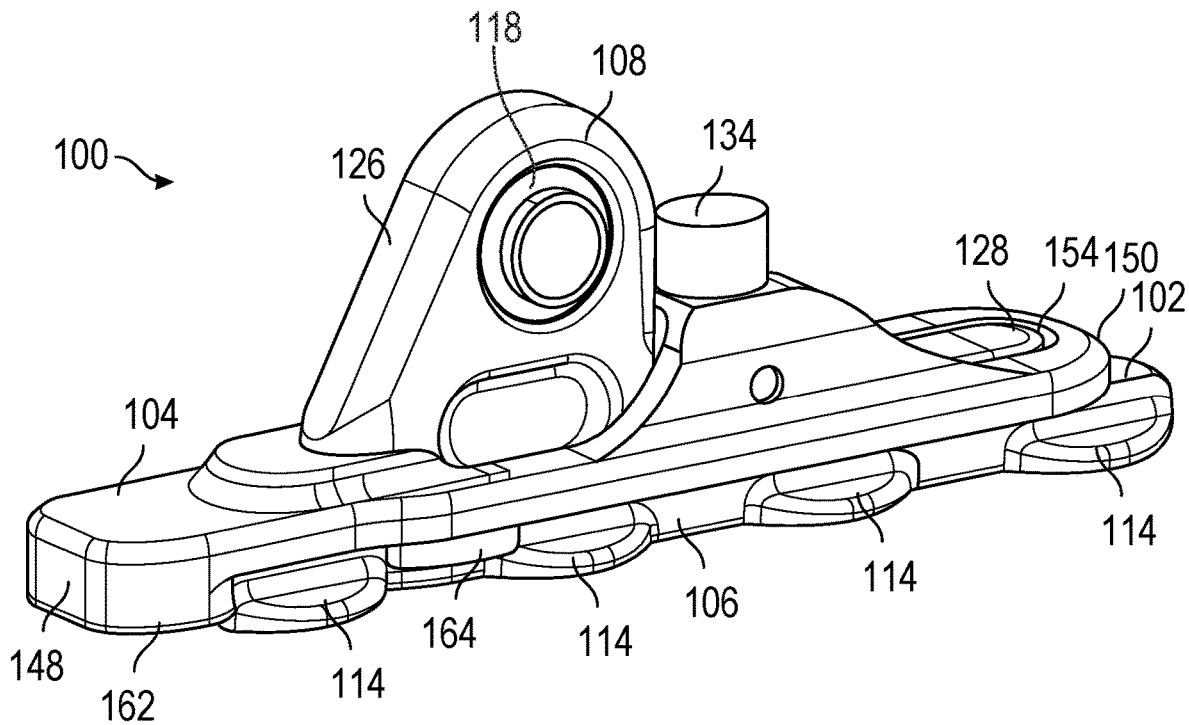
FIG. 2 is a top perspective view of the track fitting assembly of FIG. 1.
Figure 3:
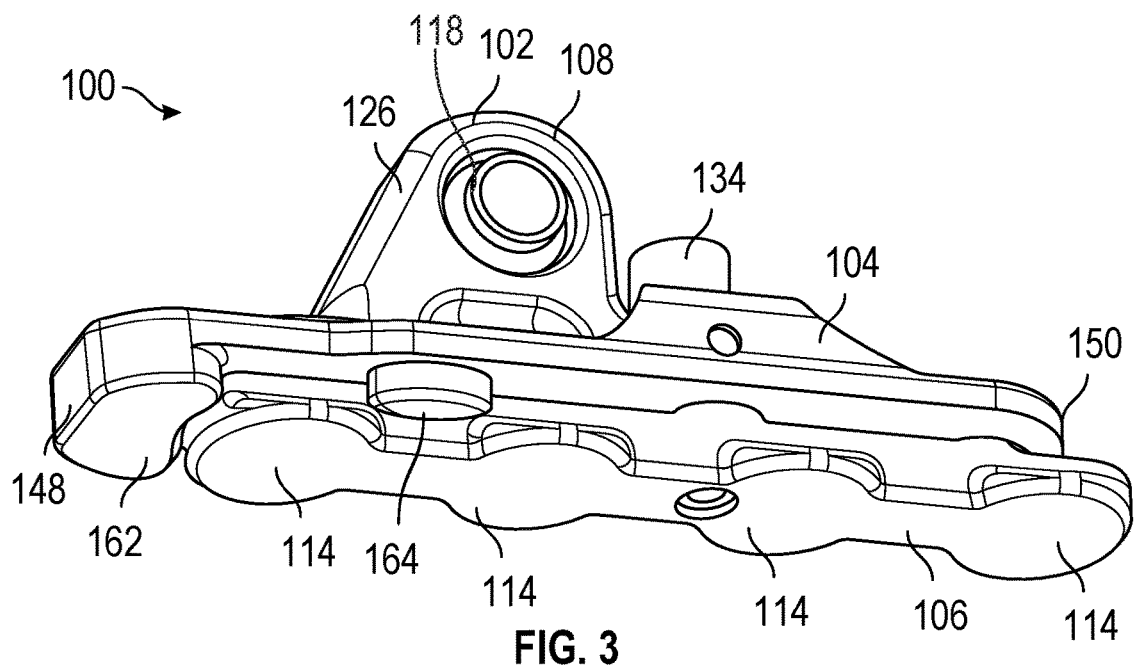
FIG. 3 is a bottom perspective view of the track fitting assembly of FIG. 1.
Figure 4:
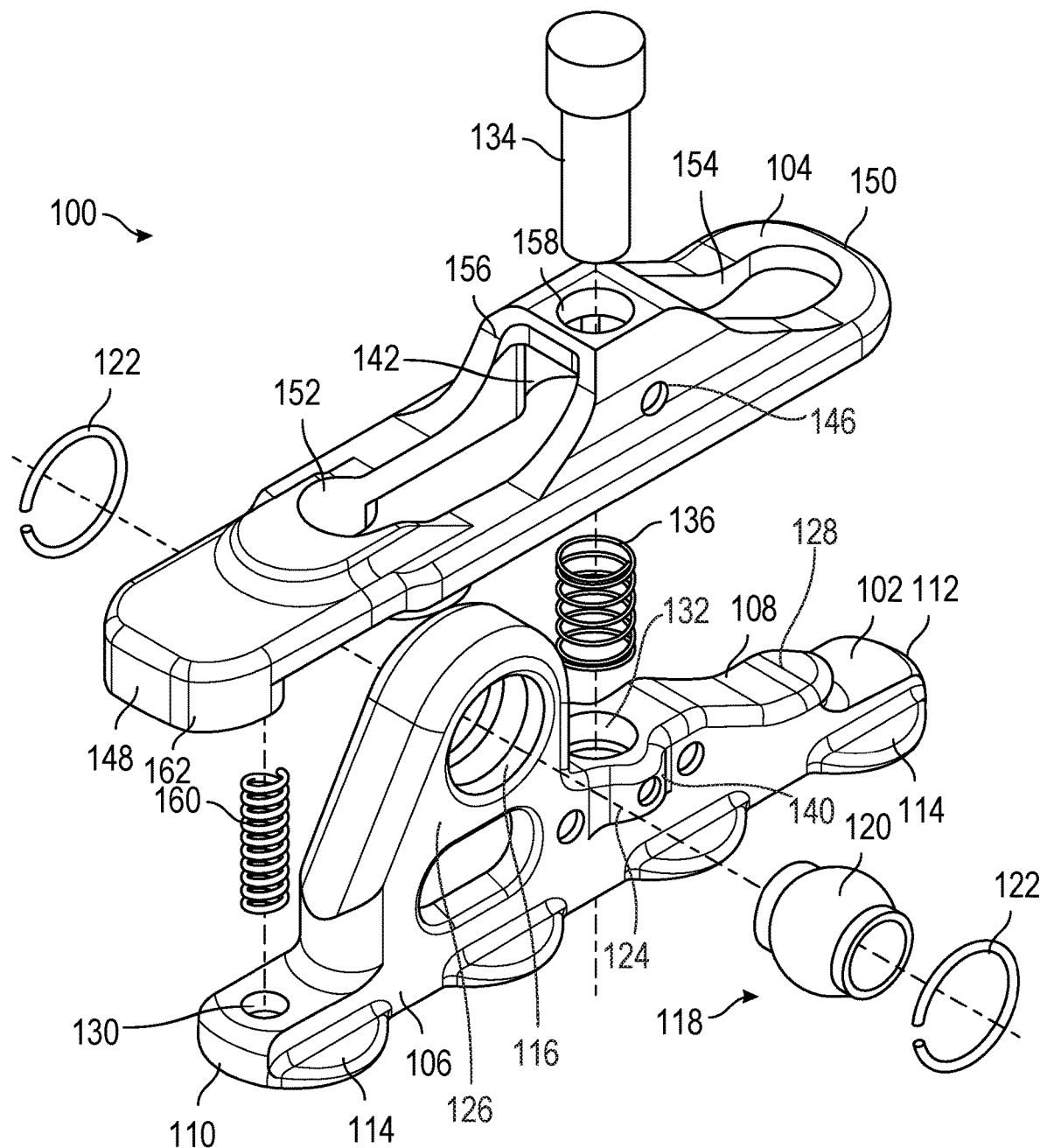
FIG. 4 is an exploded assembly view of the track fitting assembly of FIG. 1.

As best illustrated in FIGS. 2-7, the track fitting main body 102 includes a base 106 and a protuberance 108 extending from the base 106. The base 106 includes a forward end 110 and an aft end 112 opposite from the forward end 110. In certain examples, the protuberance 108 extends from the base 106 at a location between the forward end 110 and the aft end 112. The base 106 includes at least one stud 114 that is configured to engage the track 202 to secure the track fitting assembly 100 to the track 100. In some examples the base 106 includes a plurality of studs 114. In certain examples, the base 106 includes at least three studs 114, such as at least four studs 114, although it need not in other examples, In the example of FIGS. 1-7, the base 106 includes four studs 114. In some examples, and as best illustrated in FIG. 4, the base 106 includes a forward cavity 130 that at least partially receives a biasing member 160. The forward cavity 130 is optionally forward of the protuberance 108, although it need not be in other examples.

The protuberance 108 is the portion of the track fitting main body 102 that engages the passenger seat 200. In certain examples, at least one stud 114 is forward of the protuberance 108. In various examples, the protuberance 108 defines an aperture 116, and a connector 118 for engaging the passenger seat 200 is retained in the aperture 116. In the example of FIGS. 2-7, the connector 118 is a spherical bearing 120 that is held in place with spring clips 122, and a bolt (not illustrated) may connect a leg of the passenger seat 200 with the spherical bearing 120; however, in other examples, the connector 118 may be other suitable mechanisms for engaging the passenger seat 200 as desired.

In addition to the aperture 116, the protuberance 108 includes a connecting portion 124. In some cases, the connecting portion 124 is between a first portion 126 of the protuberance 108 and a second portion 128 of the protuberance 108, although it need not be in other examples. In some examples, and as illustrated in FIGS. 2-7, the first portion 126 may optionally defined the aperture 116. The connecting portion 124 includes a connecting cavity 132 that at least partially receives a portion of a connector 134 when the track fitting assembly 100 is assembled and as discussed in greater detail below. The connecting cavity 132 may also optionally at least partially receive a portion of a biasing member 136, which is discussed in greater detail below. In such examples with the biasing member 136, the connecting cavity 132 may include a ledge that engages the biasing member 136 within the connecting cavity 132.

In certain examples, the connecting portion 124 includes guides 140 that selectively engage corresponding channels 142 on the anti-rattle shear body 104. In various aspects, engagement of the guides 140 with the channels 142 may facilitate alignment and positioning of the anti-rattle shear body 104 on the track fitting main body 102.

Optionally, the protuberance 108 includes one or more alignment features 144. In certain examples, the alignment features 144 provide a visual indication indicating that the anti-rattle shear body 104 is properly installed on the track fitting main body 102. In various examples, the visual indication may include one of the alignment features 144 aligning with an alignment aperture 146 on the anti-rattle shear body 104 such that the particular alignment feature is visible through the alignment aperture 146. However, in other examples, the alignment features may provide various other types of indications as desired that indicate proper or improper installation of the anti-rattle shear body 104 on the track fitting main body 102.

Figure 5:
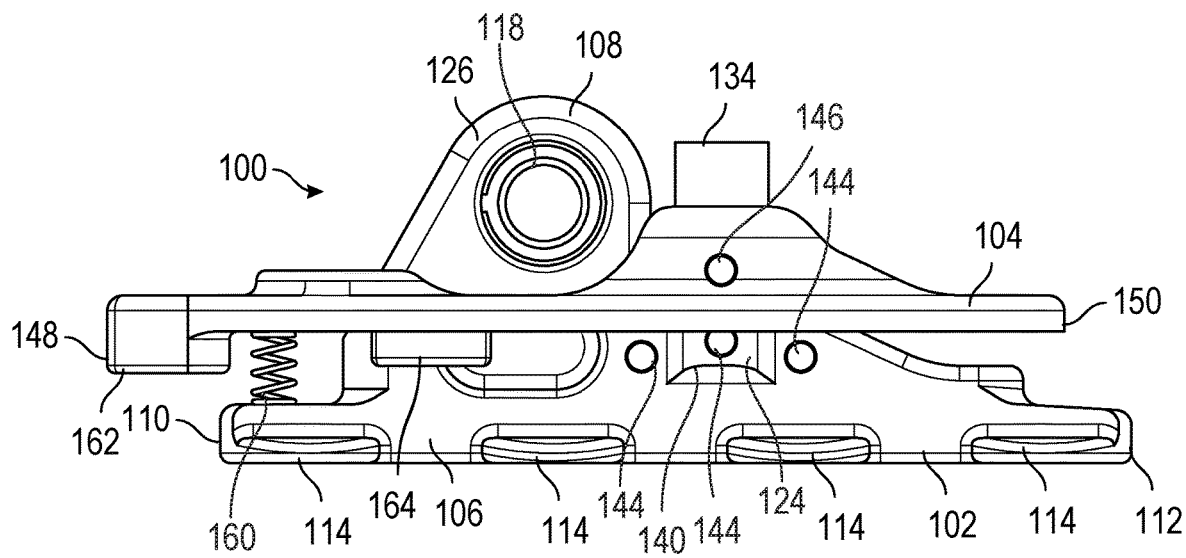
FIG. 5 is a side view of the track fitting assembly of FIG. 1 with an anti-rattle shear body in a first position.
Figure 6:
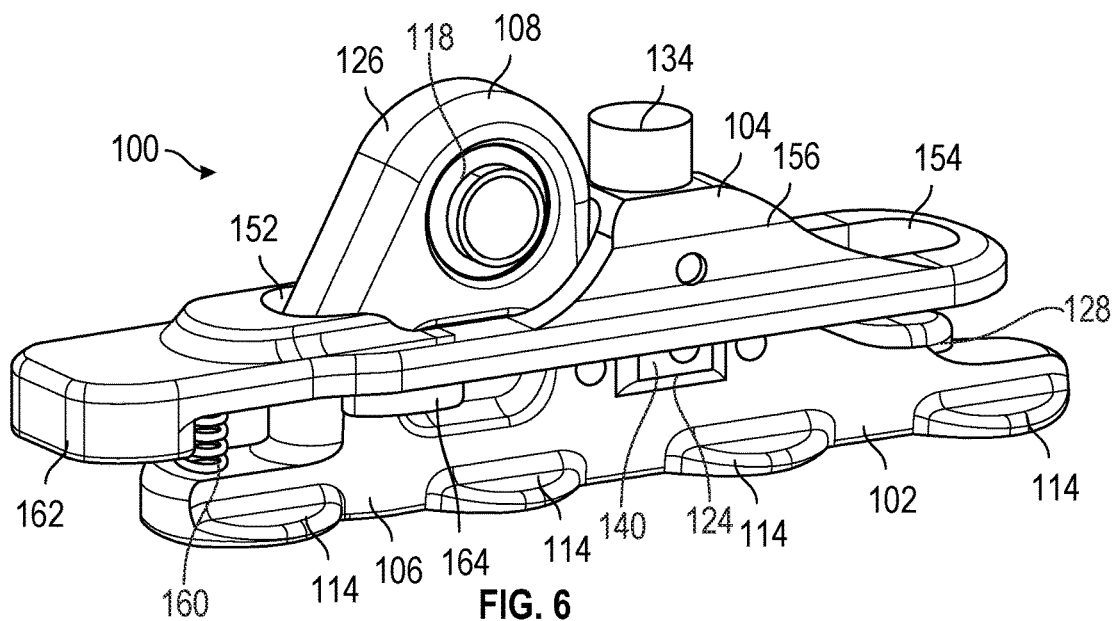
FIG. 6 is a perspective view of the track fitting assembly of FIG. 1 with the anti-rattle shear body in the first position.
Figure 7:
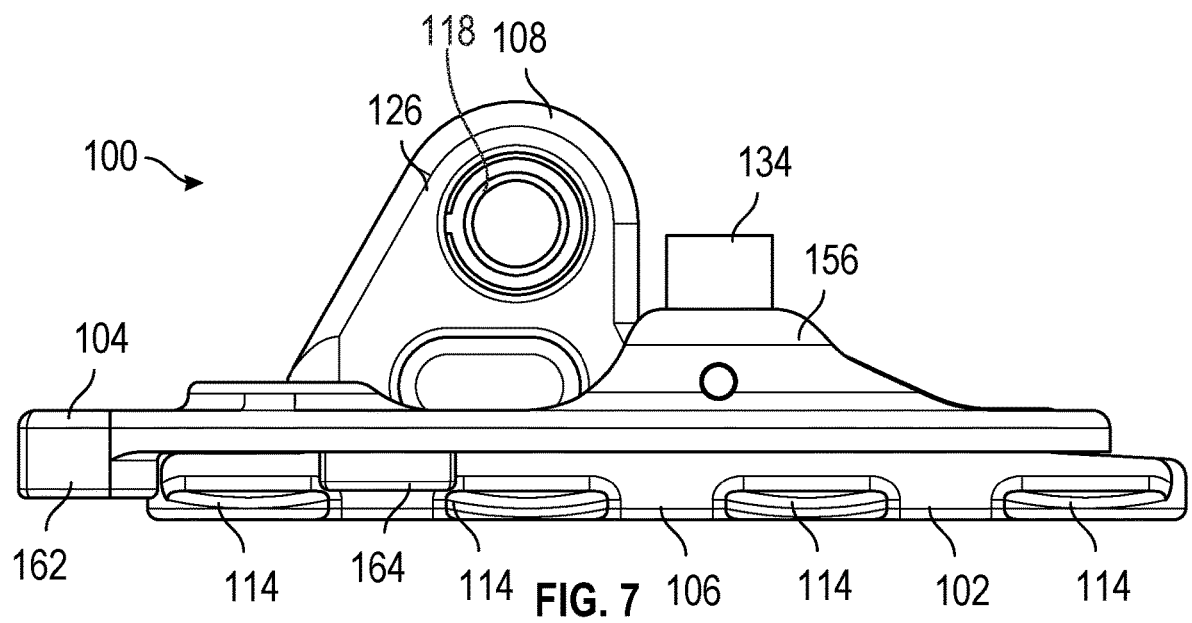
FIG. 7 is a side view of the track fitting assembly of FIG. 1 with the anti-rattle shear body in a second position.

The anti-rattle shear body 104 is positionable on the track fitting main body 102 and is movable relative to the track fitting main body 102 between a locked position (FIG. 7) and an unlocked position (FIGS. 5 and 6). In various examples, one or more biasing members are provided between the anti-rattle shear body 104 and the track fitting main body 102. In the example of FIGS. 1-7, the track fitting assembly 100 includes two biasing members: the forward biasing member 160 and the aft biasing member 136. However, in other examples, the track fitting assembly 100 may include a single biasing member or a plurality of biasing members. The biasing members 136, 160 may be various suitable devices or mechanisms that bias the anti-rattle shear body 104 away from the track fitting main body 102 (i.e., towards the unlocked position). In the example of FIGS. 1-7, the biasing members 136, 160 are springs, although other suitable mechanisms may be utilized.

The anti-rattle shear body 104 includes a forward end 148 and an aft end 150 opposite from the forward end 148. As best illustrated in FIGS. 3, 5, and 6, the anti-rattle shear body 104 includes a plunger 162 proximate to the forward end 148. In various examples, the anti-rattle shear body 104 is assembled on the track fitting main body 102 such that the plunger 162 is forward of the forward end 110 of the track fitting main body 102. The plunger 162 is configured to engage openings in the track 202 when the anti-rattle shear body 104 is in the locked position. In some cases, the anti-rattle shear body 104 optionally includes one or more supplemental plungers 164 in addition to the plunger 162. The supplemental plungers 164 may be on the anti-rattle shear body 104 between the plunger 162 and the aft end 150, and similar to the plunger 162, are configured to engage openings in the track 202. Optionally, one of the supplemental plungers 164 may engage the track 202 at a location between two of the studs 114 of the track fitting main body 102. Engagement of the plunger 162 with the track 202 and optionally the supplemental plungers 164 with the track 202 may secure the track fitting assembly 100 relative to the track 202.

In various examples, the anti-rattle shear body 104 includes a forward aperture 152 and an aft aperture 154 between the forward end 148 and the aft end 150. As best illustrated in FIGS. 2, 5, and 6, when the anti-rattle shear body 104 is assembled on the track fitting main body 102, the first portion 126 of the protuberance 108 of the track fitting main body 102 is at least partially positionable within the forward aperture and at least a portion of the second portion 128 of the protuberance 108 of the track fitting main body 102 is at least partially positionable within the aft aperture 154.

In various examples, the anti-rattle shear body 104 includes a connecting portion 156 between the forward aperture 152 and the aft aperture 154. The connection portion 156 may optionally include one or more alignment apertures 146. The connecting portion 156 includes the channels 142 (or other suitable feature that engages the guides 140) and an aperture 158. The aperture 158 selectively receives the connector 134. The connector 134 may be various suitable devices for connecting the anti-rattle shear body 104 to the track fitting main body 102, including, but not limited to, screw, bolts, pins, other threaded fasteners, hooks, etc. In various aspects, the connector 134 selectively positions the anti-rattle shear body 104 between the locked position and the unlocked position. When the anti-rattle shear body 104 is assembled on the track fitting main body 102, the connecting portion 156 of the anti-rattle shear body 104 may engage the connecting portion 124 of the protuberance 108 such that the channels 142 of the connecting portion 156 engage the guides 140 of the protuberance 108.

Referring to FIGS. 5 and 6, the anti-rattle shear body 104 may be initially installed on the track fitting main body 102 such that the anti-rattle shear body 104 is in the unlocked position. As illustrated in FIGS. 5 and 6, one or more of the alignment features 144 are offset from the alignment aperture 146 in the unlocked position. In various aspects, which the anti-rattle shear body 104 is in the unlocked position, the track fitting main body 102 may be initially posited relative to the track 202.

To fully engage the track fitting assembly 100 with the track 202, the connector 134 is adjusted such that the anti-rattle shear body 104 is moved from the unlocked position to the locked position. In some optional examples, adjusting the connector 134 includes torqueing or rotating the connector 134. The anti-rattle shear body 104 may utilize a large surface area around the track fitting main body 102 that contacts and clamps the track 202 and provides an improved connection between the track fitting assembly 100 and the track 202. The improved clamping effect may locally stiffen the track 202 and minimize or reduce the ability of the edges of the track 202 to pry up or down. The loads on the track 202 may also be better distributed as the track fitting assembly 100 may minimize upward loading on the track 202. As a non-limiting example, the plunger 162 may transfer minimized or reduced upward loading on the track 202 such that most loading on the track 202 is in the longitudinal and lateral directions.

A collection of exemplary embodiments, including at least some explicitly enumerated as "Examples," providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

Example 1. A track fitting assembly for a passenger seat, the track fitting assembly comprising: a track fitting main body connectable to a leg of a passenger seat and comprising: a forward end; an aft end; and at least one stud configured to engage a track; and an anti-rattle shear body on the track fitting main body, wherein the anti-rattle shear body is movable relative to the track fitting main body and comprises: a forward end; an aft end; and a plunger at the forward end and configured to engage the track, wherein the anti-rattle shear body is connected to the track fitting main body such that the plunger of the anti-rattle shear body is forward of the forward end of the track fitting main body.

Example 2. The track fitting assembly of any preceding or subsequent examples or combination of examples, further comprising a biasing mechanism between the track fitting main body and the anti-rattle shear body, wherein the biasing mechanism biases the anti-rattle shear body away from the track fitting main body.

Example 3. The track fitting assembly of any preceding or subsequent examples or combination of examples, wherein the at least one stud comprises at least four studs.

Example 4. The track fitting assembly of any preceding or subsequent examples or combination of examples, wherein the track fitting main body further comprises a protuberance configured to connect to the leg of the passenger seat, and wherein the at least one stud of the track fitting main body is forward of the protuberance.

Example 5. The track fitting assembly of any preceding or subsequent examples or combination of examples, wherein the anti-rattle shear body further comprises: a forward aperture between the forward end and the aft end; an aft aperture between the forward aperture and the aft end; and a connecting portion between the forward aperture and the aft aperture, wherein a first portion of the protuberance is positionable within the forward aperture, a second portion of the protuberance is positionable within the aft aperture, and wherein the connecting portion is configured to engage a third portion of the protuberance between the first portion and the second portion.

Example 6. The track fitting assembly of any preceding or subsequent examples or combination of examples, further comprising a fastener engaging the connecting portion of the anti-rattle shear body and the third portion of the protuberance such that the anti-rattle shear body is connected to the track fitting main body.

Example 7. The track fitting assembly of any preceding or subsequent examples or combination of examples, wherein the plunger is a first plunger, and wherein the anti-rattle shear body further comprises a second plunger between the first plunger and the aft end of the anti-rattle shear body.

Example 8. A track fitting assembly for a passenger seat, the track fitting assembly comprising: a track fitting main body comprising: a base comprising a forward end and an aft end, wherein the base comprises at least one stud configured to engage a track; a protuberance extending from the base between the forward end and the aft end; and an anti-rattle shear body on the track fitting main body, wherein the anti-rattle shear body comprises: a forward end; an aft end; a forward aperture between the forward end and the aft end; and an aft aperture between the forward aperture and the aft end, wherein the anti-rattle shear body is movable relative to the track fitting main body such that a first portion of the protuberance is positionable within the forward aperture and a second portion of the protuberance is positionable within the aft aperture.

Example 9. The track fitting assembly of any preceding or subsequent examples or combination of examples, further comprising a biasing mechanism between the track fitting main body and the anti-rattle shear body, wherein the biasing mechanism biases the anti-rattle shear body away from the track fitting main body.

Example 10. The track fitting assembly of any preceding or subsequent examples or combination of examples, wherein the biasing mechanism comprises at least two springs between the track fitting main body and the anti-rattle shear body, wherein a first spring of the at least two springs is between the track fitting main body and the anti-rattle shear body forward of the protuberance, and wherein a second spring of the at least two springs is between the track fitting main body and the anti-rattle shear body aft of the protuberance or between the track fitting main body and the protuberance.

Example 11. The track fitting assembly of any preceding or subsequent examples or combination of examples, wherein the anti-rattle shear body further comprises a plunger at the forward end, wherein the plunger is configured to engage the track, wherein the anti-rattle shear body is connected to the track fitting main body such that the plunger of the anti-rattle shear body is forward of the forward end of the track fitting main body.

Example 12. The track fitting assembly of any preceding or subsequent examples or combination of examples, wherein: the anti-rattle shear body further comprises a connecting portion between the forward aperture and the aft aperture; the connecting portion is configured to engage a third portion of the protuberance between the first portion and the second portion; and the track fitting assembly further comprises a fastener engaging the connecting portion of the anti-rattle shear body and the third portion of the protuberance such that the anti-rattle shear body is connected to the track fitting main body.

Example 13. The track fitting assembly of any preceding or subsequent examples or combination of examples, wherein the at least one stud comprises a plurality of studs, and wherein at least one stud of the plurality of studs is forward of the protuberance.

Example 14. A track fitting assembly for a passenger seat, the track fitting assembly comprising: a track fitting main body comprising: a forward end; an aft end; and a plurality of studs configured to engage a track; and an anti-rattle shear body on the track fitting main body, wherein the anti-rattle shear body is movable relative to the track fitting main body and comprises: a forward end; an aft end; and a plunger configured to engage the track, wherein the anti-rattle shear body is connected to the track fitting main body such that the plunger is forward of a forward-most stud of the plurality of studs of the track fitting main body.

Example 15. The track fitting assembly of any preceding or subsequent examples or combination of examples, wherein the plunger is a first plunger, and wherein the anti-rattle shear body further comprises a second plunger between the first plunger and the aft end of the anti-rattle shear body.

Example 16. The track fitting assembly of any preceding or subsequent examples or combination of examples, wherein the track fitting main body further comprises a protuberance between the forward end and the aft end of the track fitting main body and configured to connect to a leg of the passenger seat.

Example 17. The track fitting assembly of any preceding or subsequent examples or combination of examples, wherein at least one stud of the plurality of studs is forward of the protuberance.

Example 18. The track fitting assembly of any preceding or subsequent examples or combination of examples, wherein the anti-rattle shear body further comprises: a forward aperture between the forward end and the aft end; an aft aperture between the forward aperture and the aft end; and a connecting portion between the forward aperture and the aft aperture, wherein a first portion of the protuberance is positionable within the forward aperture, a second portion of the protuberance is positionable within the aft aperture, and wherein the connecting portion is configured to engage a third portion of the protuberance between the first portion and the second portion.

Example 19. The track fitting assembly of any preceding or subsequent examples or combination of examples, wherein the plurality of studs comprises at least four studs.

Example 20. The track fitting assembly of any preceding or subsequent examples or combination of examples, further comprising a biasing mechanism between the track fitting main body and the anti-rattle shear body, wherein the biasing mechanism biases the anti-rattle shear body away from the track fitting main body.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A track fitting assembly for a passenger seat, the track fitting assembly comprising:
    a track fitting main body connectable to a leg of the passenger seat and comprising:
        a forward end;
        an aft end; and
        at least one stud configured to engage a track; and
    an anti-rattle shear body on the track fitting main body, wherein the anti-rattle shear body is movable relative to the track fitting main body and comprises:
        a forward end;
        an aft end; and
        a plunger at the forward end and configured to engage the track,
    wherein the anti-rattle shear body is connected to the track fitting main body such that the plunger of the anti-rattle shear body is forward of the forward end of the track fitting main body and such that the anti-rattle shear body extends over a top side of the track fitting main body between the forward end and the aft end of the track fitting main body.

2. The track fitting assembly of claim 1, further comprising a biasing mechanism between the track fitting main body and the anti-rattle shear body, wherein the biasing mechanism biases the anti-rattle shear body away from the track fitting main body.

3. The track fitting assembly of claim 1, wherein the at least one stud comprises at least four studs.

4. The track fitting assembly of claim 1, wherein the track fitting main body further comprises a protuberance extending upwards from a base of the track fitting main body, the protuberance configured to connect to the leg of the passenger seat, and wherein the at least one stud of the track fitting main body is forward of the protuberance.

5. The track fitting assembly of claim 4, wherein the anti-rattle shear body further comprises:
    a forward aperture between the forward end and the aft end;
    an aft aperture between the forward aperture and the aft end; and
    a connecting portion between the forward aperture and the aft aperture,
    wherein a first portion of the protuberance is positionable within the forward aperture, a second portion of the protuberance is positionable within the aft aperture, and wherein the connecting portion is configured to engage a third portion of the protuberance between the first portion and the second portion.

6. The track fitting assembly of claim 5, further comprising a fastener engaging the connecting portion of the anti-rattle shear body and the third portion of the protuberance such that the anti-rattle shear body is connected to the track fitting main body.

7. The track fitting assembly of claim 1, wherein the plunger is a first plunger, and wherein the anti-rattle shear body further comprises a second plunger between the first plunger and the aft end of the anti-rattle shear body.

8. A track fitting assembly for a passenger seat, the track fitting assembly comprising:
    a track fitting main body comprising:
        a base comprising a forward end and an aft end, wherein the base comprises at least one stud configured to engage a track;
        a protuberance extending from the base between the forward end and the aft end; and
    an anti-rattle shear body on the track fitting main body, wherein the anti-rattle shear body comprises:
        a forward end;
        an aft end;
        a forward aperture between the forward end and the aft end; and
        an aft aperture between the forward aperture and the aft end,
    wherein the anti-rattle shear body is movable relative to the track fitting main body such that a first portion of the protuberance is positionable within the forward aperture, a second portion of the protuberance is positionable within the aft aperture, and the anti-rattle shear body extends over a portion of the protuberance between the forward end and the aft end of the base of the track fitting main body.

9. The track fitting assembly of claim 8, further comprising a biasing mechanism between the track fitting main body and the anti-rattle shear body, wherein the biasing mechanism biases the anti-rattle shear body away from the track fitting main body.

10. The track fitting assembly of claim 9, wherein the biasing mechanism comprises at least two springs between the track fitting main body and the anti-rattle shear body, wherein a first spring of the at least two springs is between the track fitting main body and the anti-rattle shear body forward of the protuberance, and wherein a second spring of the at least two springs is between the track fitting main body and the protuberance.

11. The track fitting assembly of claim 8, wherein the anti-rattle shear body further comprises a plunger at the forward end, wherein the plunger is configured to engage the track, wherein the anti-rattle shear body is connected to the track fitting main body such that the plunger of the anti-rattle shear body is forward of the forward end of the track fitting main body.

12. The track fitting assembly of claim 8, wherein:
the anti-rattle shear body further comprises a connecting portion between the forward aperture and the aft aperture;
the connecting portion is configured to engage a third portion of the protuberance between the first portion and the second portion; and
the track fitting assembly further comprises a fastener engaging the connecting portion of the anti-rattle shear body and the third portion of the protuberance such that the anti-rattle shear body is connected to the track fitting main body.

13. The track fitting assembly of claim 8, wherein the at least one stud comprises a plurality of studs, and wherein at least one stud of the plurality of studs is forward of the protuberance.

14. A track fitting assembly for a passenger seat, the track fitting assembly comprising:
a track fitting main body comprising:
a forward end;
an aft end; and
a plurality of studs configured to engage a track; and
an anti-rattle shear body on the track fitting main body, wherein the anti-rattle shear body is movable relative to the track fitting main body and comprises:
a forward end;
an aft end; and
a plunger configured to engage the track,
wherein the anti-rattle shear body is connected to the track fitting main body such that the plunger is forward of a forward-most stud of the plurality of studs of the track fitting main body and the anti-rattle shear body extends over a top side of the track fitting main body between the forward end and the aft end.

15. The track fitting assembly of claim 14, wherein the plunger is a first plunger, and wherein the anti-rattle shear body further comprises a second plunger between the first plunger and the aft end of the anti-rattle shear body.

16. The track fitting assembly of claim 14, wherein the track fitting main body further comprises a protuberance between the forward end and the aft end of the track fitting main body and configured to connect to a leg of the passenger seat.

17. The track fitting assembly of claim 16, wherein at least one stud of the plurality of studs is forward of the protuberance.

18. The track fitting assembly of claim 17, wherein the anti-rattle shear body further comprises:
a forward aperture between the forward end and the aft end;
an aft aperture between the forward aperture and the aft end; and
a connecting portion between the forward aperture and the aft aperture,
wherein a first portion of the protuberance is positionable within the forward aperture, a second portion of the protuberance is positionable within the aft aperture, and wherein the connecting portion is configured to engage a third portion of the protuberance between the first portion and the second portion.

19. The track fitting assembly of claim 14, wherein the plurality of studs comprises at least four studs.

20. The track fitting assembly of claim 14, further comprising a biasing mechanism between the track fitting main body and the anti-rattle shear body, wherein the biasing mechanism biases the anti-rattle shear body away from the track fitting main body.

* * * * *